United States Patent [19]

Marley

[11] 4,011,287

[45] Mar. 8, 1977

[54] STEAM CONDITIONING VALVE

[76] Inventor: David John Marley, Santa Ana, Calif.

[73] Assignee: Control Components, Inc., Irvine, Calif.

[22] Filed: July 11, 1975

[21] Appl. No.: 594,992

[52] U.S. Cl. .............................. 261/64 R; 122/487; 261/76; 261/118; 261/DIG. 13

[51] Int. Cl.² ............................................ B01F 3/04

[58] Field of Search ............ 261/DIG. 13, 39 R, 62, 261/64 R, 66, 76, 118; 122/487, 2; 137/625.28; 251/127

[56] References Cited

UNITED STATES PATENTS

| | | | |
|---|---|---|---|
| 3,134,827 | 5/1964 | Pontow et al. | 261/DIG. 13 X |
| 3,220,708 | 11/1965 | Matsui | 261/DIG. 13 X |
| 3,590,788 | 7/1971 | Michel | 122/487 |
| 3,732,851 | 5/1973 | Self | 122/487 |

FOREIGN PATENTS OR APPLICATIONS 828,444  5/1938  France .................................. 261/62

*Primary Examiner* — Frank W. Lutter
*Assistant Examiner* — William Cuchlinski, Jr.

[57] ABSTRACT

A steam conditioning valve having a multi-turn labyrinth disk stack mounted between the inlet and the outlet of the valve is provided with a cooling fluid spray assembly for injecting the cooling fluid into the valve upstream of the labyrinth. The spray assembly includes a cooling fluid supply line extending through the valve housing without physically contacting the housing to prevent heat transfer between the cooling fluid line and the valve housing.

12 Claims, 4 Drawing Figures

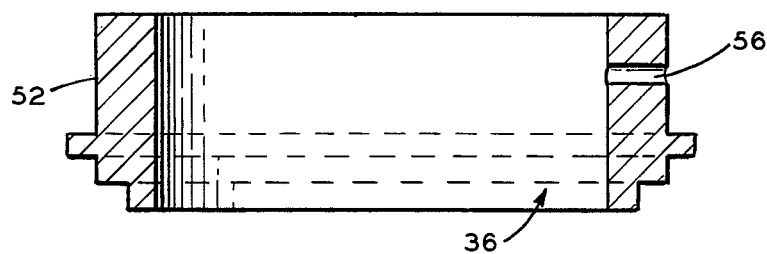
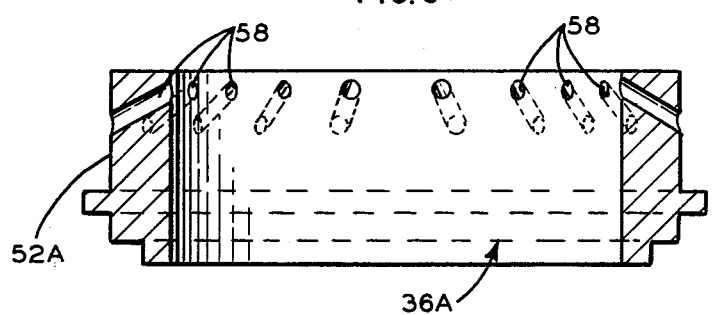
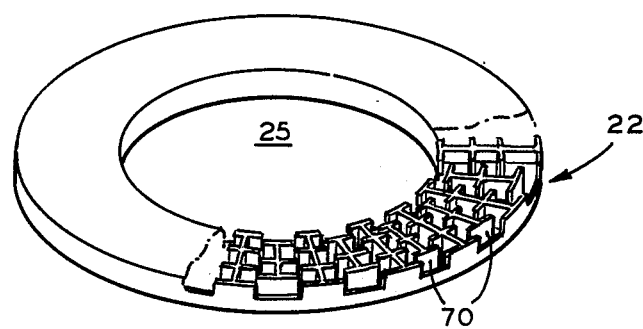

STEAM CONDITIONING VALVE

BACKGROUND OF THE INVENTION

1. Field of the Invention

This invention generally relates to devices for conditioning the temperature and pressure of fluids and particularly to valves which simultaneously reduce the temperature and pressure of superheated steam by injecting cooling fluid into the valve which fluid is mixed with the stream flowing through the valve during the pressure reduction stage.

2. Description of the Prior Art

Heretofore it has been customary to condition superheated steam by subjecting the steam first to a pressure drop in an appropriate pressure reducing valve and then to inject desuperheating water into the steam after it leaves the pressure reducing valve. That is, the temperature-reducing water was introduced into the steam downstream from the steam pressure-reducing valve. This method required the connection of a long extent of pipe downstream to the valve outlet wherein cold water could be sprayed through a temperature controlled valve and a spray nozzle structure. It is also known to spray cooling water into the throat area of the pressure-reducing valve to allow the mixing of steam and water to occur downstream in a straight run portion of pipe.

These prior art arrangements suffered the disadvantage of having a relatively long section or run of pipe downstream from the pressure-reducing valve making the arrangement bulky and expensive. These prior art arrangements also displayed other problems such as difficulty in attaining uniform mixing of the cooling water with the steam, inefficient heat transfer, tendency toward noisy operation, requirement for interstage pressure taps on the feedwater pump, difficulty in controlling the turndown ratio, requirement for desuperheaters, high alloy steel downstream pipelines, bypass valves, etc., all of which have required costly equipment and have left much to be desired in function and results.

Recently steam conditioning valves have been developed which simultaneously reduce the temperature and pressure of the steam by introducing the temperature reducing water upstream of the valve and allowing the steam and water to be mixed in a disk stack labyrinth structure located in the valve. Examples of such labyrinth structures used in such valves may be found in U.S. Pat. No. 3,513,864 and 3,514,074 issued to Richard E. Self. These labyrinth structures reduce the steam pressure and provide excellent mixing between the steam and water to also reduce the steam temperature. An example of such a known steam conditioning valve may be found in U.S. Pat. No. 3,732,851 issued to Richard E. Self.

The above-mentioned steam conditioning valve has a cooling water spray orifice formed in a movable plug member used to control the flow of steam into the labyrinth structure. As such the orifice moves with the plug member and cannot be supplied with cooling water from any rigid stationary water supply line. Instead, the valve housing on the side of the plug member opposite the orifice is formed as a variable volume water supply chamber which is in continuous communication with the plug member orifice through a passageway extending through the plug member. The water supply chamber, however, cools that part of the valve housing enclosing the supply chamber and produces temperature gradients between the high temperature steam inlet side of the valve housing and the low temperature water supply chamber side of the valve housing. Thermal stresses are thereby produced in the valve which may cause cracking of the valve housing from thermal fatigue.

SUMMARY OF THE INVENTION

The discussed prior art problems as well as other problems are solved by the present invention which provides a steam conditioning valve having a system of introducing cooling fluid into the valve which substantially prevents any direct heat transfer between the cooling fluid supply and the valve housing from physical contact between the housing and the cooling fluid line.

To accomplish this a cooling fluid spray nozzle is stationarily positioned in the steam inlet of the valve housing and a cooling fluid line is extended through the valve housing, without physically contacting the valve housing, to connect the spray nozzle and supply cooling fluid to the nozzle. The stationary nozzle obviates any need for forming a water supply chamber in the valve housing since the cooling fluid line may be directly connected to the spray orifice. Also since the cooling fluid line has substantially no direct physical contact with the valve housing, temperature gradients are eliminated in the valve housing and thermal stresses are prevented.

Since the spray orifice is not located in the valve control plug of the valve a further advantage is obtained. The valve plug may be formed to have a passageway therethrough which allows the steam pressure to be communicated to both sides of the valve plug thereby equalizing the pressure across the plug and allowing a minimal exertion of force to easily move the plug to different steam control flow positions.

From the foregoing it will be seen that one aspect of the present invention is to provide a steam conditioning valve whose housing is physically isolated from the cooling fluid supply line of the valve.

Another aspect of the present invention is to provide a steam conditioning valve having a pressure balanced valve plug.

Yet another aspect of the present invention is to provide a steam conditioning valve wherein the cooling fluid flow to the valve is controlled according to the temperature of the steam exiting from the valve to maintain a constant steam outlet temperature from the valve.

These and other aspects of the present invention will be more readily understood after a review of the following description of the preferred embodiment of the invention considered in conjunction with the accompanying drawings.

BRIEF DESCRIPTION OF THE DRAWINGS

FIG. 2 is an enlarged sectional side view of the orifice arrangement of the valve of FIG. 1.

FIG. 3 is an enlarged sectional side view of an alternate orifice arrangement for the valve of FIG. 1.

FIG. 4 is an enlarged fragmentary detailed view of one type of member forming the multi-turn labyrinth for the valve of FIG. 1.

DESCRIPTION OF THE PREFERRED EMBODIMENT

Figure 1:
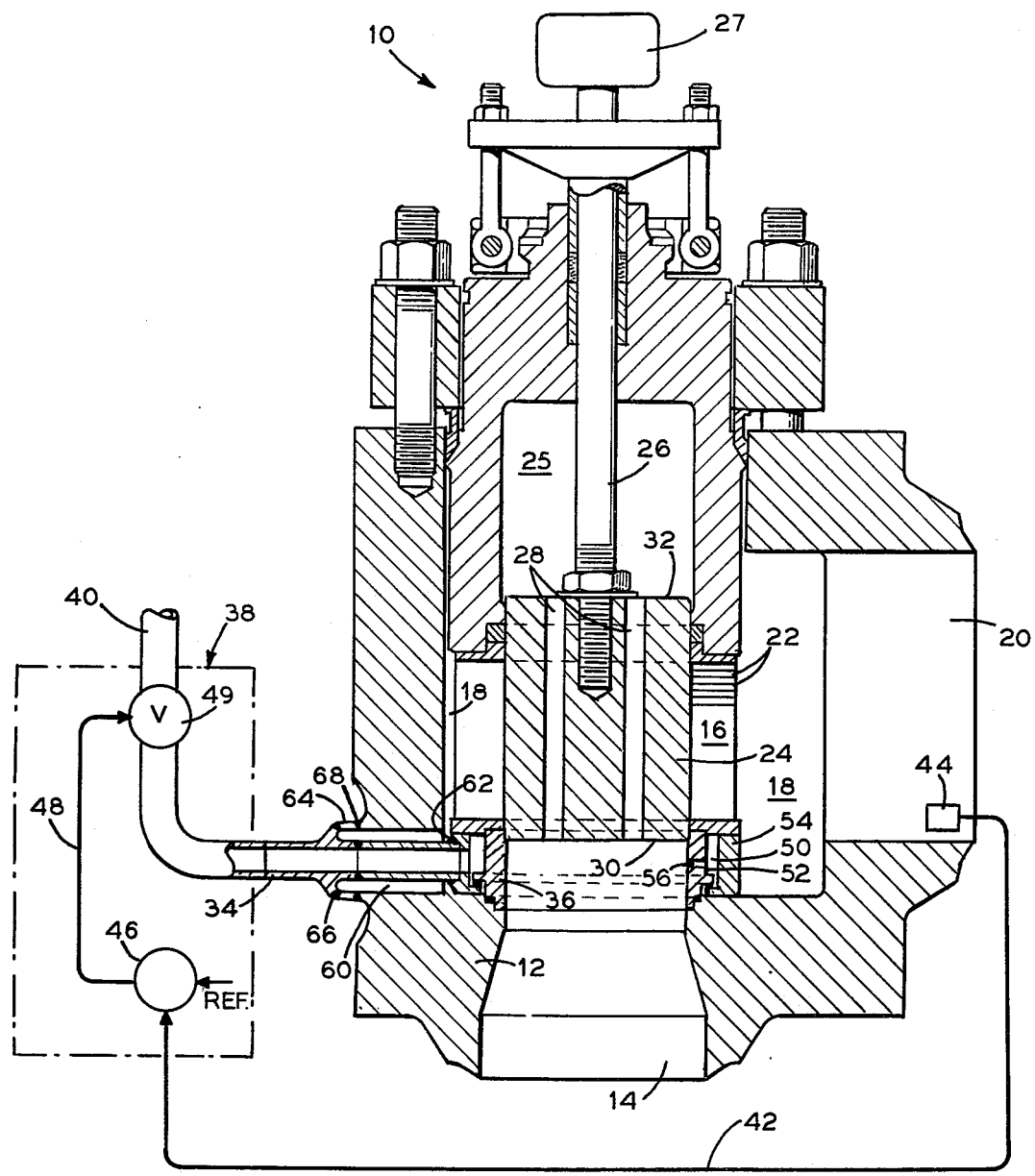
FIG. 1 is a vertical sectional view of a steam conditioning valve of the present invention.

Referring now to the drawings it is seen that steam is conditioned in a valve 10 to reduce its temperature and pressure by the introduction of cooling water into the steam and thereafter reducing the steam pressure. The valve 10 is more specifically a high energy loss fluid control valve wherein steam entering a valve body housing 12 by way of an inlet 14 is subdivided and passed through a multi-turn labyrinth formed in an annular control disk stack 16, thence, passing into a chamber or gallery 18 encompassing the disk stack 16 and thence out through an outlet 20. It is understood, of course, that suitable piping will be connected to the inlet 14 and the outlet 20. In passing through the control disk stack 16, the steam is greatly subdivided in a generally depicted labyrinth arrangement of flow control passages, exemplified in FIG. 4, wherein each of numerous individual disks 22 in the stack 16 has at least on one face thereof a plurality of flow-subdividing and confining control passageways 70 providing a large number of angular turns between the inner perimeter of the annular stack 16 and the outer perimeter thereof so that as the plurality of subdivided streams travel therealong high frictional resistance losses are imparted to the flowing fluid. The general configuration of the labyrinth may be varied in accordance with the teachings of U.S. Pat. No. 3,514,074 issued May 26, 1970 which discloses other useful labyrinth configurations. As a result of the use of any of these labyrinths, highly efficient control of both velocity and pressure of the fluid is attained in a substantially erosion-free, quiet, and vibration-free manner in a minimum operating space.

The rate of steam flow through the pressure-reducing disk stack 16 is controlled by a valve plug 24 which is reciprocably slidably mounted within a central bore 25 defined by the stacked arrangement of the disks 22 into the disk stack 16. The steam enters into the peripheral entrance openings of the pressure-reducing passages 70 of any of the disks 22 which are uncovered by the plug 24. The plug 24 is operated through a valve stem 26 projecting from one end of the body 12 by an actuator (not shown) connected to the stem 26 by a stem clamp 27 and controlled by a positioner (not shown). This arrangement maintains a uniform steam pressure-responsive flow rate or volume flow through the pressure-reducing disk stack 16.

Actuation of the valve plug 24 is accomplished by the application of minimum force to the stem clamp 27 due to pressure balancing across the valve plug 24. This pressure balancing is accomplished through a pair of passageways 28 extending longitudinally through the valve plug 24. These passageways communicate steam pressure to both faces 30 and 32 of the valve plug 24 placing it in a pressure balanced condition which is disrupted by any application of an unbalanced force to the valve plug 24 through the stem 26. Thus minimal force is required to move the plug and improved steam flow controllability is achieved.

Steam temperature reduction is attained by introducing cooling water into the steam before the steam passes through the pressure-reducing disk stack 16. Introduction of the cooling water to the steam is effected in the region of the inlet to the disk stack 16. To this end, cooling water is introduced into the steam, preferably under suitable injection pressure, through a connecting line 34 sealably connected to an orifice plate 36 which is mounted proximately to the inlets of the disk stack 16. Desirably the line 34 is connected to any suitable source of water under the desired pressure such as a pressurized tank, pump, or the like. Through this arrangement, the water is, in effect, injected by the orifice plate 36 into the steam on the upstream side of the valve at the point of maximum steam temperature and heat content for most efficient heat transfer. Further, the water and steam are subjected to turbulent mixing and expansion for complete vaporization and effective temperature control by the time the steam leaves the disk stack 16 and passes to the discharge or outlet 20.

The amount of cooling water supplied to the line 34 is controlled by a control valve assembly 38 mounted between the line 34 and a main water supply line 40. The control valve assembly 38 is responsive to a control signal applied to the assembly 38 through a signal line 42 connecting the control valve assembly 38 to a well known temperature sensor 44 mounted in the outlet 20. The temperature sensor 44 monitors the steam temperature in the outlet 20 and communicates a control signal to a summing station 46 of the assembly 38 through line 42 which signal is indicative of the steam temperature. The summing station compares the control signal with a reference signal and establishes an error signal along line 48 to a control valve 49 to appropriately restrict or increase the flow of supply water from the supply line 40 through the line 34 until a zero error signal is established by the summing station 46 indicative of a desired steam temperature being achieved at the outlet 20. The proper amount of cooling water necessary to maintain a desired steam outlet temperature is thereby maintained for varying amounts of steam flow through the valve 10.

The cooling water line 34 is supplied to a sealed annular cavity 50 formed between an outside face 52 of the orifice plate 36 and an annular seating ring 54 to which the line 34 is sealably connected. The cooling fluid is maintained pressurized in the cavity 50 and is sprayed from the orifice plate 36 into the inlet 14 of the valve 10 to partially mix with the steam before the steam and cooling water enter the disk stack 16 to be more thoroughly mixed therein to cool the steam at the same time as the steam pressure is reduced by its passage through the disk stack 16.

As may be best seen with reference to FIG. 2 and 3 the orifice plate 36 may be formed to include a single orifice 56 approximately 1/16 inches in diameter and extending perpendicularly to the face 52 of the orifice plate 36. Alternatively the orifice plate 36A may be formed to include a plurality of smaller orifices 58 extending circumferentially around the orifice plate 36A and being angled therethrough to direct the spray of cooling fluid circumferentially into the inlet of the disk stack 16.

The inlet line 34 is spacedly extended through the valve housing 12 to substantially eliminate any physical contact between the housing 12 and the line 34. This is accomplished by forming an annular opening 60 in the housing 12 which is larger than the outside diameter of the line 34 and supporting the line 34 therein. The line 34 is supported at one end by welding the circumference of the line 34 to the ring 54 at section 62. The other end of the line 34 is welded to a spacing ring 64 at a section 66 with the spacing ring 64 being in turn welded to the housing 12 at section 68. The spacing ring 64 not only spacedly supports the line 34 in the opening 60 but also seals the opening 60 from the ambient. In this particular embodiment the opening 60 is made to be in communication with the chamber 18 and cooled outlet steam is thereby free to circulate around the cooling line 34 sealed within the opening 60. This cooled steam acts as a buffer zone between the cold exterior of the line 34 and the hot valve body 12 to provide a gradual temperature transition and minimize thermal shocking of the valve body 12 through direct physical contact with the cold line 34 which contact may cause valve body 12 cracking. Should a cooler surrounding be desired for the line 34, the opening 60 could easily be sealed from communication with the steam outlet chamber 18 and instead be opened to the valve ambient through appropriately placed openings in the spacer ring 64.

From the foregoing it will be apparent that the present invention provides a device which simultaneously reduces steam pressure and temperature to easily controlled values by the controlled injection of cooling water into the device through a physically isolated cold water line to minimize thermal shock to the body of the device. Typical uses for the device are found in auxiliary steam start-up systems, turbine bypasses, plant heating systems, compressor fan drives, and the like.

It will be understood that although a specific embodiment of the device was disclosed certain variations and modifications may be effected by those skilled in the art and that such variations and modifications were deleted for the sake of conciseness and readability but properly fall within the spirit and scope of the claimed invention.

What I claim is:

1. A steam conditioning valve for reducing high temperature high pressure steam at the inlet of the valve to low temperature low pressure steam at the outlet of the valve comprising:
    a valve housing having a steam inlet area and a steam outlet area;
    a series of members forming a multi-turn labyrinth mounted in said valve housing between the inlet area and the outlet area to require the steam to flow through the multi-turn labyrinth before reaching the outlet area;
    an orifice member spacedly mounted in the inlet area of said valve housing to prevent substantial physical contact with said valve housing, said orifice member also being mounted proximate to said series of members for spraying cooling fluid into the inlet area side of said series of members; and
    a cooling fluid line spacedly extending through said valve housing to prevent substantial physical contact with said valve housing and being connected to said orifice member to supply cooling fluid to said orifice member.

2. A steam conditioning valve as set forth in claim 1 including:
    means for controlling the entry of steam into said series of members forming a multi-turn labyrinth; and
    means for balancing the steam pressure across said controlling means.

3. A steam conditioning valve as set forth in claim 2 wherein said controlling means includes a movable plug extendible into said series of members to block a part of the multi-turn labyrinth and wherein said balancing means includes a passageway extending through said movable plug to allow steam pressure to be applied across said valve plug.

4. A device for conditioning steam to reduce its temperature and pressure comprising:
    a housing having a steam inlet and a steam outlet;
    pressure reducing means, located between the inlet and the outlet of said housing, for reducing the pressure of steam flowing from the inlet to the outlet, said pressure reducing means including a stack of members forming a multi-turn labyrinth for the flow of steam and cooling fluid therethrough and having a circular bore therein providing an inlet to the multi-turn labyrinth;
    a valve plug movable within the circular bore of said stack to control the entry of steam and cooling fluid into the multi-turn labyrinth of said stack of annular members, said valve plug having a passageway formed therein to extend longitudinally therethrough for balancing the steam pressure across said valve plug;
    spray means, mounted in said housing, for injecting cooling fluid into the stream; and
    supply means for supplying cooling fluid to said spray means in said housing with substantially no physical contact between said supply means and said housing.

5. A device as set forth in claim 4 wherein said spray means includes a stationary spray nozzle mounted proximate to said pressure reducing means for spraying cooling fluid into the steam inlet of said housing to mix with the steam therein.

6. A device as set forth in claim 5 wherein said supply means includes a cooling fluid line extending through an aperture formed in a wall of said housing and being sealably connected to said spray nozzle.

7. A device as set forth in claim 6 wherein said supply means further includes spacing means for supporting said cooling fluid line in said aperture to substantially eliminate any physical contact between said cooling fluid line and said housing.

8. A device as set forth in claim 7 including sealing means located around the inlet of said cooling fluid line to said housing to seal the annular opening of said housing around said cooling fluid line.

9. A device as set forth in claim 6 including:
    fluid control means connected to said cooling fluid line for varying the flow of fluid thereto in response to a control signal; and
    means for establishing a control signal to said fluid control means in response to the condition of the steam in the steam outlet of said housing.

10. A device as set forth in claim 9 wherein said control signal means includes a temperature sensor mounted in the steam outlet of said housing to sense the temperature of the steam flowing therethrough and establish a control signal indicative thereof.

11. A device as set forth in claim 10 wherein said fluid control means includes a control valve for changing the flow of water to said cooling fluid line in response to a control signal indicative of a change in steam temperature.

12. A device as set forth in claim 4 wherein said spray means includes a series of spray nozzles mounted around the periphery of the steam inlet of said housing for spraying cooling fluid into the inlet of said housing to mix with the steam therein.

* * * * *